UNITED STATES PATENT OFFICE.

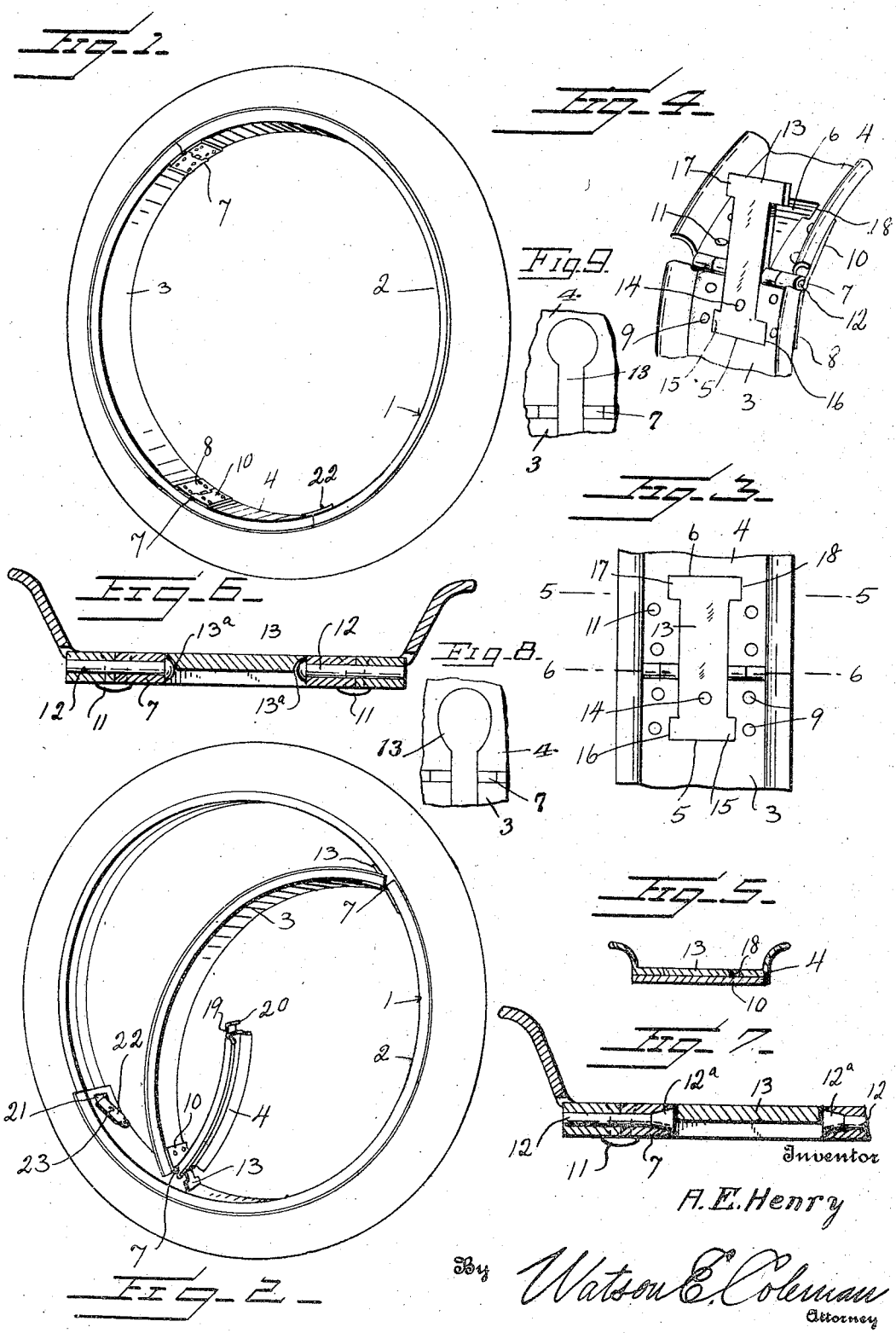

ABNER E. HENRY, OF GREENSBURG, PENNSYLVANIA.

DEMOUNTABLE WHEEL-RIM.

1,327,759.           Specification of Letters Patent.     Patented Jan. 13, 1920.

Application filed April 21, 1919. Serial No. 291,511.

*To all whom it may concern:*

Be it known that I, ABNER E. HENRY, a citizen of the United States, residing at Greensburg, in the county of Westmoreland and State of Pennsylvania, have invented certain new and useful Improvements in Demountable Wheel-Rims, of which the following is a specification, reference being had to the accompanying drawings.

This invention relates to the art of wheels, and particularly to the rim constructions, and more especially to a demountable type of rim.

The invention aims to provide an improved demountable rim having novel means for coupling or uniting the sections of the rim, whereby they may be easily collapsed or moved, as hereinafter set forth and illustrated, for facilitating the removal of the tire, that is after detaching the rim from the felly of the wheel.

The invention further aims to provide improved hinging means for uniting the sections of the rim and including means carried by one end of one of the sections, to overlap and engage the end portion of an adjacent section, when the sections are in position and in engagement with the tire, in order to not only reinforce the sections at the point of their connection, but also to reinforce the hinge members.

The invention further aims to provide an I-shaped sheet metal reinforcing plate bridging the joint between the hinge leaves and being countersunk in surfaces of the rim section and being riveted to one of the leaves of the hinge, thereby reinforcing the joint between the sections, as well as reinforcing the leaves of the hinge, particularly relieving the lateral strains or twisting actions transversely of the rim sections, adjacent where they unite.

The invention further aims to provide the lateral lugs of one end of the I-shaped reinforcing plate with corresponding beveled edges to engage and coöperate with the corresponding edges of the recess of one of the rim sections, to facilitate the reception of one end of said I-shaped reinforcement plate.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in perspective of a wheel rim, showing the rim sections in place, and a tire mounted on the rim.

Fig. 2 is a perspective view of a wheel rim, showing certain of the rim sections disconnected, illustrating two of the sections as having been moved to positions, whereby the remaining rim section may be detached from the tire.

Fig. 3 is an enlarged detail plan view of the united ends of two of the rim sections, showing the perimeter of the rim sections and illustrating the I-shaped sheet metal reinforcing plate in position.

Fig. 4 is an enlarged detail perspective view of the united end portions of two of the rim sections, showing one of the sections partially moved, and illustrating one end of the I-shaped sheet metal reinforcing plate out of engagement with the recess of one of the sections.

Fig. 5 is a sectional view on line 5—5 of Fig. 3.

Fig. 6 is a sectional view on line 6—6 of Fig. 3.

Fig. 7 is a view of a modified construction for hingedly uniting the adjacent ends of the rim sections.

Fig. 8 is a detail view showing the ends of the reinforcing plate 13 elliptical shape.

Fig. 9 is a detail view showing the ends of the reinforcing plate circular shape.

Referring more especially to the drawings 1 designates the wheel rim as a whole, and which rim comprises a plurality of segmental sections 2, 3 and 4. The adjacent ends of the sections 3 and 4 are provided with T-shaped cutaway portions 5 and 6, and 7 denotes a hinge. A leaf 8 of the hinge 7 is riveted or otherwise secured at 9 to the inner surface of the rim section 3, and it is obvious that this leaf 8 bridges the cutaway portions 5 and forms a bottom therefor. The other leaf 10 of the hinge 7 is similarly riveted or otherwise secured at 11 to the inner surface of the rim section 3, said leaf 10 likewise bridging the cutaway portion 6 and affording a bottom for said recess. It is to be noted that where these cutaway portions adjoin, the uniting rolls or sleeves of the hinge leaves 8 and 10 are cutaway, the purpose of which will be hereinafter apparent. The usual pin 12 passes through the hinge rolls or sleeves, thereby hingedly uniting the hinge leaves. It is to be noted that the cutaway portions 5 and 6 are T-shaped, and 13 denotes an I-shaped sheet metal reinforcing plate. One end of this plate is riveted or otherwise secured at 14 to the hinge leaf 8, the lateral lugs 15 of said plate engaging in the lateral portions 16 of the T-shaped cutaway portion 5. Obviously, it will be seen that in so connecting the end of the reinforcing plate to the hinge leaf 8, said plate is countersunk, whereby its surface is flush with the perimeter of the rim section 3, thereby avoiding any obstruction to the firm and true mounting of the tire on the rim. It is to be noted that when the rim section 4 is in position, the other end of the I-shaped sheet metal reinforcing plate engages and is countersunk in the cutaway portion 6, contacting with the leaf 10 of the hinge, thereby affording no obstruction to the proper mounting of the tire on the rim. The lateral lugs 17 of this latter end of the I-shaped reinforcing plate engage corresponding parts 18 of the cutaway portion 6. Corresponding edges of the lateral portions 18 of the cutaway portion 6 are beveled, as shown, to be engaged by beveled edges of the lateral lugs 17, of the latter end of the reinforcing plate. The rim sections 2 and 3 are connected by a similarly constructed I-shaped reinforcing plate engaging between the rolls of the hinge joint between the sections 2 and 3, and it is to be observed that the connecting parts of the rim sections 2 and 3 are designated similarly to the corresponding parts of the joint between the sections 3 and 4. An extension 19 is formed integrally on the end (which is opposite the hinged end) of the rim section 4. This extension 19 has a lateral lug 20, to engage an opening 21 of the section 1 of the rim, that is when the rim sections are arranged in the positions shown in Fig. 1. A cover plate 22 is pivotally mounted at 23 to the rim section 1, and when the lug of the extension is in engagement with the opening 21, this cover plate is moved, to overlie the extremity of the extension.

Referring to the drawings, particularly Figs. 3, 4, 6 and 7, it is to be noted that the body of the reinforcing plate 13 is positioned between the adjacent ends of the hinge rolls or barrels, and the body of this reinforcing plate is thick enough, so as to become positioned between the adjacent heads of the hinge pins, the opposite edges of the body of the reinforcing plate being slightly recessed as shown at $13^a$, as shown in Fig. 6, for the reception of the heads of the hinge pins 12. By this construction, it will be noted that axial movement of the hinge pins inwardly toward each other is prevented, whereas the heads of the pins prevent them from moving axially outwardly. It will be observed that by virtue of this construction that the joint of the sections is greatly reinforced, particularly at the location of the hinge rolls. Furthermore, by the construction and arrangement of the reinforcing plate all lateral strains upon the hinge rolls and the hinge pins are relieved, in fact reduced to a minimum, and by so reinforcing the joint between the sections of the rim, the rim is substantially rigid, as if it were constructed in one piece.

In Fig. 7, the hinge pins and their arrangement are slightly modified, to the extent that the hinge pins have tapered heads $12^a$, which are countersunk in the adjacent hinge rolls, and by means of the opposite edges of the body of the reinforcing plate, the hinge pins are held in place, the heads $12^a$ are also held in countersunk positions in the adjacent hinge rolls. By this construction, it will be noted that the extreme adjacent ends of the heads are flush with the adjacent ends of the hinge rolls, and by means of the opposite edges of the body of the reinforcing plate engaging between the hinge rolls, and partly between the countersunk heads of the hinge pins, the hinge joint is not only considerably reinforced, but also the hinge pins, which are held against axial movement inwardly by the opposite edges of the body of the reinforcing plate.

It is to be noted that the hinge leaves may be made as integral parts with the rim sections, instead of riveting the leaves to the sections. In forming the leaves on the sections in this manner, it is obvious that the cutaway portions 5 and 6 would then be as recesses, for the reception of the reinforcing plate, that is in countersunk position in such recesses, provided the reinforcing plate is made as a separate part. However, should the reinforcing plate be made as an integral part of one of the sections of the rim, which it can be in some instances, then only one of the sections of the rim may be provided with a countersunk recess, such as 5 and 6, for the reception of the other end of the reinforcing plate. While it is obvious that the hinge leaves and the reinforcing plate may be made as integral parts with the rim sections, enabling the rim sections and such parts to be made at one time, there are advantages gained by making the hinge leaves and the reinforcing plate as separate parts from the rim sections. For instance, should one of the hinge leaves become damaged, rendering it useless, it is possible to detach it by removing the rivets, and attaching a new hinge leaf, thereby enabling the rim to be repaired very much cheaper than it could be, should the hinge leaf be made as a part of the rim section, which would require an entire new rim section, should the hinge leaf become broken. It is possible where the reinforcing plate is made as a separate part from the rim section, to permit the reinforcing plate to be easily detached, by disconnecting the rivets, in order to permit a new reinforcing plate to be attached. A new reinforcing plate could not be attached, should the damaged plate be constructed as an integral part of the rim section, without inserting an entire new rim section.

It is obvious that the reinforcing plate 13 may be any suitable shape or configuration, other than that illustrated. For instance, I-shaped heads of the plate may be circular, elliptical, or similarly shaped to fit correspondingly constructed cutaway portions or recesses 5 and 6.

From the foregoing it is to be observed that the I-shaped sheet metal reinforcing bridging plate (which engages between the hinge rolls or sleeves of the hinge leaves) thereby reinforcing the hinge leaves and their hinged connections, also reinforces the united ends of the rim sections, thereby relieving the lateral strains or twisting actions, which would otherwise exist at points adjoining the hinged ends of the rim sections.

The invention having been set forth, what is claimed as new and useful is:

1. The combination with the adjoining ends of a pair of rim sections, of a hinge having its leaves connected to the rim sections, the hinge rolls of the hinge being intermediate the adjoining ends of the rim sections, thereby hingedly uniting the rim sections, the intermediate parts of the hinge rolls being cut away, a sheet metal reinforcing bridging plate engaging the intermediate cut-away portion of the hinged rolls and being countersunk in the adjacent end portions of the rim sections, so as to reinforce the hinge, and means whereby one end of the plate may be secured to one of the leaves of the hinge.

2. The combination with the adjoining ends of a pair of rim sections, said adjoining ends having cutaway portions, of a hinge having its leaves secured to the rim sections, thereby covering the cutaway portions and forming bottoms therefor, a reinforcing bridging plate countersunk in one of the cutaway portions and being riveted to one of said leaves, whereby the other end of said plate may engage and disengage the other cutaway portion, and when engaged therewith, being countersunk, whereby it is flush with the perimeter of the rim section, the rolls or sleeves of the leaves of the hinge having their intermediate parts cut away, whereby the bridging plate may bridge the joint between the leaves, acting to relieve the lateral twisting or straining actions between the rim sections.

3. The combination with the adjoining ends of a pair of rim sections, said ends having T-shaped cutaway portions, of a hinge having its leaves riveted to the adjoining ends of the rim sections, bottoms for the T-shaped cutaway portions, of an I-shaped sheet metal reinforcing bridging plate having one end riveted to one of the leaves, and countersunk in one of said T-shaped portions in flush relation to the perimeter of the rim section, the other end of the I-shaped plate being adapted to removably engage the other T-shaped portion of the adjacent rim section, in flush relation with the perimeter of the rim section, whereby lateral strains or twisting actions are relieved on the adjoining rim sections.

4. The combination with the adjoining ends of a pair of rim sections, said ends having T-shaped cutaway portions, of a hinge having its leaves riveted to the adjoining ends of the rim sections, thereby forming bottoms for the T-shaped cutaway portions, of an I-shaped sheet metal reinforcing bridging plate having one end riveted to one of the leaves, and countersunk in one of said T-shaped portions in flush relation to the perimeter of the rim section, the other end of the I-shaped plate being adapted to removably engage the other T-shaped portion of the adjacent rim section in flush relation with the perimeter of the rim section, whereby lateral strains or twisting actions are relieved on the adjoining rim sections, one end of the I-shaped reinforcing bridging plate having corresponding edges of its lateral lugs beveled, and the corresponding edges of the lateral parts of one of the T-shaped cutaway portions being correspondingly beveled to be coöperated with by the first beveled edges, to facilitate the removal and the reception of one end of said I-shaped plate in one of said cutaway portions.

5. A collapsible tire rim, comprising a plurality of rim sections, certain of said rim sections having their adjacent ends hingedly united, one of said hinged ends having a countersunk recess, the other hinged end having a reinforcing plate countersunk in said recess and being positioned between the adjacent ends of the hinge rolls and the adjacent ends of the hinge pins of the hinge connection.

6. In a collapsible tire rim, the combination with a plurality of collapsible rim sections, of a hinge having its hinge rolls engaging between the adjacent ends of certain of said rim sections, for hingedly uniting said sections, said hinge rolls being axially spaced, one of the hinged ends of one of the sections having a reinforcing plate positioned in the space between the hinge rolls and being countersunk in the other hinged end of the other rim section, thereby reinforcing the hinge joint between the sections.

7. In a collapsible tire rim, the combination with a plurality of rim sections, of a hinge having spaced hinge rolls, hingedly uniting the adjacent ends of certain of the rim sections, and a reinforcing member countersunk in the adjacent end portions of the rim sections and being positioned between the spaced hinge rolls and positioned between the adjacent ends of the hinge pins, thereby preventing axial movement of the pins inwardly.

8. In a collapsible tire rim, the combination with a plurality of rim sections, of pivotally united means pivotally uniting the adjacent ends of certain of the rim sections, said means being spaced endwise and axially alined, axially alined headed members uniting said means, whereby the sections may collapse inwardly, and a bracing device countersunk in certain of the faces of the end portion of the rim section and being interposed edgewise between the means and the headed members, thereby reinforcing the hinge means and preventing axial movement of the headed members toward each other.

9. In a collapsible tire rim, the combination with a plurality of rim sections, of pivotally united means pivotally uniting the adjacent ends of certain of the rim sections, said means being spaced endwise and axially alined, whereby the sections may collapse inwardly, and a bracing device carried by the end portion of one end section and being countersunk in the outer face of the end of the other rim section and being interposed edgewise between said pivotal means, thereby reinforcing said means and the sections.

In testimony whereof I hereunto affix my signature in the presence of two witnesses.

ABNER E. HENRY.

Witnesses:
 CHAS. M. HENRY,
 THOS. J. LAMBERTON.